Sept. 1, 1953 J. F. STROPNICKY 2,650,789

MOUNTING FOR TELEPHONE APPARATUS

Filed Nov. 26, 1949

3 Sheets-Sheet 1

INVENTOR
J. F. STROPNICKY

BY T. F. Kane

ATTORNEY

Sept. 1, 1953 J. F. STROPNICKY 2,650,789

MOUNTING FOR TELEPHONE APPARATUS

Filed Nov. 26, 1949 3 Sheets-Sheet 2

INVENTOR
J. F. STROPNICKY
BY A. F. Kane
ATTORNEY

MOUNTING FOR TELEPHONE APPARATUS

Filed Nov. 26, 1949

3 Sheets-Sheet 3

INVENTOR
BY J. F. STROPNICKY
A. F. Kane
ATTORNEY

Patented Sept. 1, 1953

2,650,789

UNITED STATES PATENT OFFICE 2,650,789

MOUNTING FOR TELEPHONE APPARATUS

Joseph F. Stropnicky, Bellerose, N. Y., assignor to Bell Telephone Laboratories, Incorporated, New York, N. Y., a corporation of New York Application November 26, 1949, Serial No. 129,626

2 Claims. (Cl. 248—286)

This invention relates to telephone switchboards and has particular reference to the mounting of keyshelves and similar apparatus-supporting panels thereon.

It is the object of this invention to simplify and otherwise improve the mounting of keyshelves and the like on telephone switchboards whereby the apparatus mounted on the rear thereof and the incidental electric wiring may be conveniently and expeditiously exposed for inspection and maintenance purposes.

The keyshelf is an essential component of the telephone switchboard and operating room desk. It comprises, generally, a panel upon which a plurality of key units are mounted. The exposed face of the panel displays the key levers for use by a switchboard operator or attendant, and its inner or rear side supports the contact springs and other equipment with their associated electric wiring. The panel fits into and constitutes an element, or section of the switchboard face and in order that the equipment carried on the rear side thereof may be conveniently inspected and maintained it is desirable that the panel be so mounted as to be capable of being withdrawn from the switchboard to a position in which such equipment is fully exposed and rendered conveniently accessible.

In accordance with a particular feature of this invention the keyshelf panel is supported on the switchboard structure by means of a pair of metal brace assemblies each comprising two relatively slidable members one of which is fixed to the switchboard structure and serves as a guide or raceway for the other member, to one end of which the panel is fixed. The members on which the panel is mounted are adapted to slide on the fixed brace members between two limiting positions one of which determines the home, or operating position of the panel on the switchboard and the other of which determines its fully withdrawn or extended position.

Another feature of the invention contemplates the mounting of the panel on the slidable members of the brace assemblies in such a manner that the panel, after having been withdrawn from its home position on the switchboard and moved to its fully extended position, may be revolved to a position in which the apparatus mounted on the rear face thereof becomes more conveniently accessible.

A further feature of the invention resides in the use of a lock pin arrangement which serves to lock the panel against revolution until it has been fully withdrawn from its home position on the switchboard.

Still another feature of the invention involves a locking bar which precludes movement of the panel from its fully extended position in the direction of its home position when it occupies any but its normal locked position with respect to the sliding members upon which it is mounted.

These and other features of the invention will be better understood from the following detailed description when read with reference to the accompanying drawings, in which.

Figure 1:
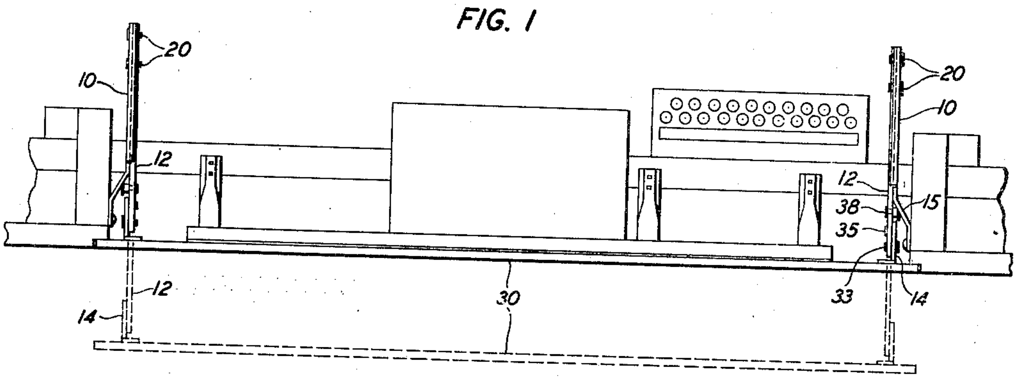
Fig. 1 is a plan view of a portion of a telephone operating room desk, or switchboard, showing a keyshelf-supporting panel mounted thereon by means of a pair of braces embodying the features of this invention. In this figure the panel is shown in its operating or home position on the switchboard; the panel is shown in broken line outline in its fully extended position.
Figure 2:
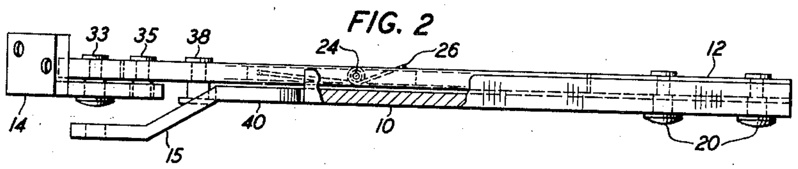
Fig. 2 is a side view of one of the brace assemblies.
Figure 3:
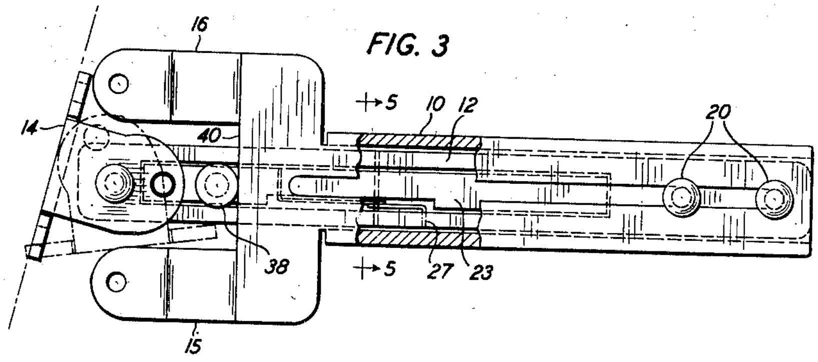
Fig. 3 is a plan view of the left side of the brace assembly shown in Fig. 2.

The brace assembly of this invention comprises essentially two complementary, relatively slidable sheet steel members, or arms 10 and 12, the arm 10 being herein called the fixed arm or track member and the arm 12 being herein characterized as the movable arm or runner. In mounting a keyshelf or similar panel on a switchboard or desk two brace assemblies are required, the two being identical except for a slight variation in the design of the brackets 14 to which the panel 30 is secured and which are mounted on the outer ends of the slidable members 12 in a manner to be described presently.

The fixed member 10 comprises an elongated channel-shaped portion and an integrally associated U-shaped bracket having its two opposed legs 15 and 16 offset from the plane of the channel portion thereof and secured to an interior frame member 9 or 17 of the switchboard by any suitable means such as screws 18. The member 10 is firmly held by the screws 18 in a horizontal position and its channel construction affords a race or track in which the slidable member 12 is adapted to slide in either direction. The member 10 is provided with an elongated slot 19 in the base thereof, closed at both ends, in which the shanks of two large-headed rivets 20 fixed to the movable member 12 are adapted to ride as the member 12 is moved in either direction on the channel member 10. The length of the slot and the location of the rivets 20 on the movable member determine the limits of the movement of the movable member in either direction.

The movable or slidable member 12 is essentially an elongated flat metal piece of such dimensions as to render it capable of being slid freely in the race effected by the channel member 10. Throughout a greater portion of its length the member 12 is provided with a rectangular slot or aperture which accommodates a substantially rectangular swivel bar 23.

Figure 4:
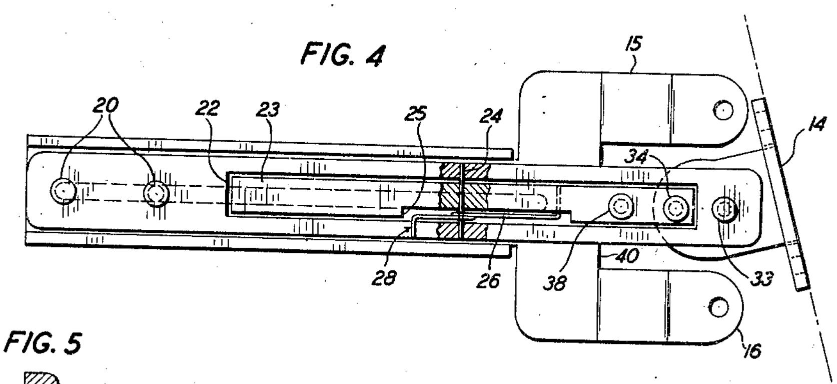
Fig. 4 is a plan view of the right side of the brace assembly shown in Figs. 2 and 3.
Figure 5:
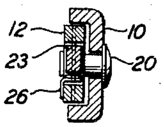
Fig. 5 is a section taken along the line 5—5 of Fig. 3 looking in the direction of the arrows.

The swivel bar 23 is mounted for limited rotational movement on a fixed swivel pin 24 which spans the slot 22 substantially at its transverse center line as clearly shown in Fig. 4. The swivel bar is cut away for a short distance at 25 to provide sufficient clearance between the bar and an inner edge of the slot 22 in the neighborhood of the swivel pin 24 to permit the mounting of a reset spring 26. This spring is coiled once about a projecting portion of the swivel pin 24; has one end bent at right angles and fitted into a suitable hole 27 in the swivel bar 23; and its other end similarly inclinated and resting upon an outer edge of the member 12 as indicated at 28 in Fig. 4. The spring 26 functions to bias the swivel bar in a counter-clockwise direction, viewing Fig. 4.

Figure 7:
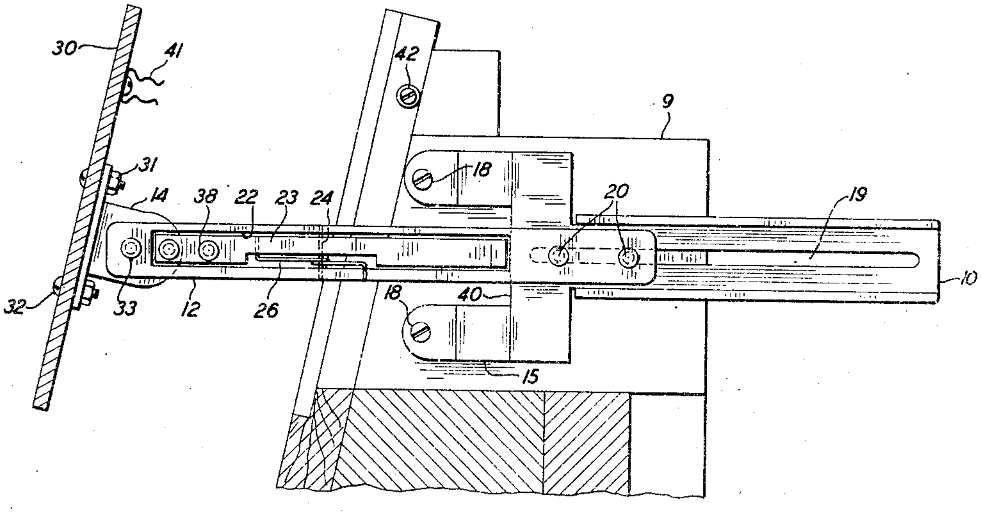
Fig. 7 is a side view of the brace and panel assembly in the position occupied thereby in Fig. 6.
Figure 9:
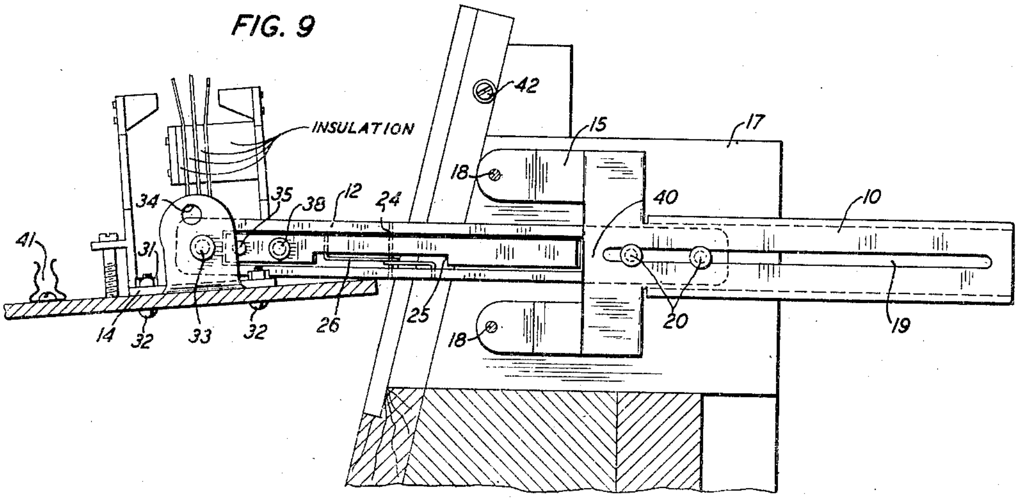
Fig. 9 is a side view of the brace and panel assembly shown in Fig. 8.

At its outer or right end, viewing Fig. 4, each movable member 12 has mounted thereon a bracket 14 which is secured to one end of the panel 30 by means of nuts 31 and bolts 32 as clearly shown in Figs. 7 and 9. The bracket 14 is mounted on the member 12 by means of the rivet 33 and is adapted to be rotated thereon with the rivet 33 constituting the axis of rotation. The shank of the rivet 33 serves as a bearing on which the bracket 14 is rotated. Near its inner edge the bracket 14 is provided with a hole or aperture 34 (Fig. 9) which normally accommodates the end of a rivet or detent 35 rigidly fixed to the swivel bar 23 near its outer end. When the bracket is in its normal position the rivets 33 and 35 are in substantial alignment on the longitudinal axis of the swivel bar 23 and the rivet 35 is seated in the hole 34 and is maintained therein under the biasing influence of the reset spring 26 on the swivel bar.

Figure 6:
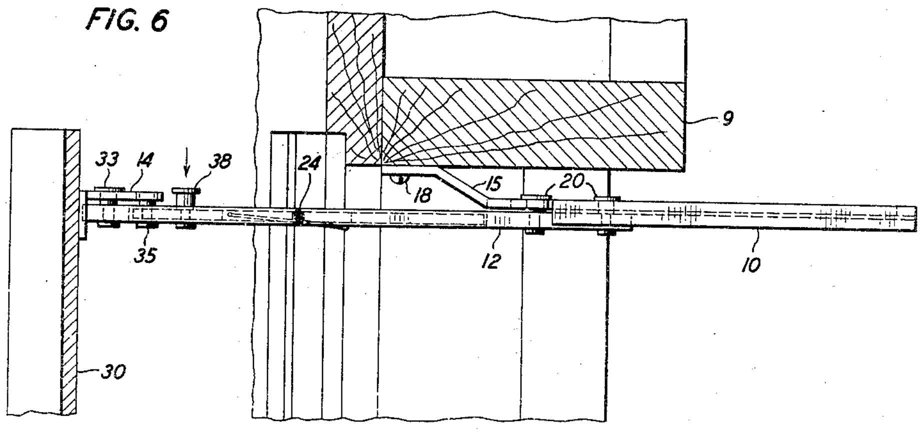
Fig. 6 is a top view (enlarged) of a brace assembly in service and shows the associated panel in its fully extended position and locked against revolution from its normal operating position relative to the brace.

It will be observed that until the movable member 12 is withdrawn to its fully extended position the swivel bar 23 cannot be rotated about the swivel pin 24 in a clockwise direction because it is not until then that the left end of the swivel bar (viewing Fig. 4) clears the outer edge 40 of the crosspiece of the U-shaped bracket formed integrally with the channel section of the fixed member 10. When the swivel bar reaches this position, illustrated in Figs. 6 and 7, it may be manually rotated against the action of spring 26 by causing pressure to be applied to the projecting end of a rivet 38 in the direction indicated by the small arrow in Fig. 6. The rivet 38 is rigidly fixed to the swivel bar near its outer, or right, end (Fig. 4) so that when pressed in the direction described the swivel bar rotates about the swivel pin 24 in a direction such that the rivet 35 is moved out of the hole or aperture 34 thereby releasing the bracket 14 for revolution about the rivet 33. It is apparent that this movement cannot be effected until the movable member 12 has been withdrawn to its fully extended position.

It will be noted that once the rivet 35 leaves the hole 34 and the swivel bar 23 is tilted, the latter will be locked in its tilted position until the bracket 14 is again returned to normal position. This is due to the fact that in every position of the bracket other than its normal position the outer end of rivet 35 abuts some portion of the bracket. It is only when the rivet 35 and the hole 34 come into alignment that the swivel bar can resume its normal position under the action of spring 26.

Figure 8:
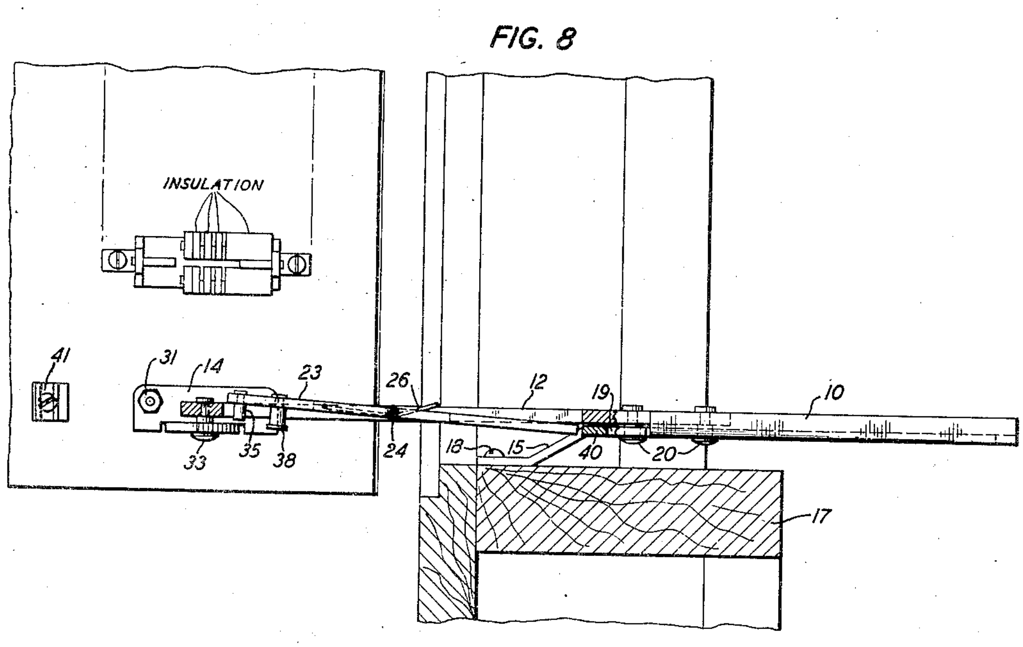
Fig. 8 is a view similar to Fig. 6 showing the panel and its other brace assembly in which the panel is in its fully extended position and has been revolved to a position in which the equipment mounted thereon is more conveniently accessible.

With particular reference to Fig. 8, it will be observed that when the swivel bar is manipulated, as described, to release the bracket 14, its inner extremity is moved into alignment with the edge of crosspiece 40 of the U-shaped bracket end of the fixed member 10. Obviously, therefore, the movable arm 12 cannot be slid back on the channel member 10 because of the now interposed crosspiece 40. To release the movable member 12 and slide it back into its home position it is necessary that the bracket 14 be rotated to the position in which the rivet or detent 35 falls into the hole 34 under the action of spring 26 on the swivel bar 23. This position corresponds to the normal operating but fully extended position of the panel 30 as illustrated in Fig. 7. When rivet 38 is pressed in the described direction, the head of the rivet interferes with the sides of slot 28. This limits the movement of the inner extremity of the swivel bar 23 with respect to crosspiece 40 so that the final position of the swivel bar falls in alignment with the crosspiece. If this were not the case, a greater travel of the swivel bar would swing its inner extremity beyond the crosspiece and permit the movable arm 12 to be partially slid back on channel 10, thus stressing the reset spring 26 beyond its elastic limit.

From the foregoing description it is apparent that the panel 30, which is fixed to brackets 14 of the two brace assemblies, may be withdrawn from the switchboard but cannot be revolved from its normal setting until it reaches the outermost limit of its withdrawal. Similarly, it is apparent that the panel, after having been revolved to the position shown in Fig. 9, or to any intermediate position, cannot be pushed back into position on the switchboard until it is first restored to the normal position illustrated in Fig. 7. It is also apparent that when the panel occupies the position shown in Fig. 9 the equipment mounted on the rear thereof is conveniently accessible for maintenance. In this position of the panel its lower edge abuts the under edges of the extended movable members 12 so as to steady the panel while work is being done on the equipment carried thereby.

When the panel is pushed back to its home position on the switchboard, spring clamps such as shown at 41 mounted on the panel, engage suitable pegs or sleeves 42 fixed to the switchboard frame to latch the panel in position on the switchboard. This method of latching the key panel has been illustrated for purposes of simplicity only. It is obvious that any other method may be employed.

What is claimed is:

1. In a brace assembly for mounting an apparatus-carrying panel on a switchboard, a track member fixed to the switchboard and having an elongated slot extending longitudinally of said track member, a slotted arm slidably mounted on said track member by means of rivets fixed to said arm and extending into the slot of said track member, a panel-mounting bracket rotatably carried on one end of said arm and having an aperture therein, a swivel bar mounted for rotation in the slot of said slidably mounted arm, a detent fixed to the outer end of said swivel bar and adapted to fit into the aperture in said panel-mounting bracket to effectively lock the bracket against rotation, means urging said swivel bar in a direction such that the detent thereof is biased in the direction of the aperture in said bracket, means including a face of said track for precluding rotation of said swivel bar in the opposite direction, said swivel bar being of such length relative to the length of said track member that when said slotted arm is withdrawn from said track member to its fully extended position its inner end just clears the face of said track member to render the said rotation-precluding means ineffective, manually engageable means for rotating said swivel bar in a direction such as to withdraw its detent from the aperture in said panel-mounting bracket, and a cross-piece formed integrally with said track member and so disposed with respect to said swivel bar when said slidable arm occupies its fully extended position and said swivel bar is rotated so as to withdraw the detent thereof from the aperture in said bracket that the inner end of said swivel bar is in alignment with said cross-bar to preclude movement of said slidable arm from its fully extended position.

2. In a device for mounting an apparatus-carrying panel on a switchboard, a track member fixed to the switchboard and having a longitudinally-extending slot therein, a support member mounted for slidable movement between home and fully extended positions in said track slot, a panel-supporting bracket pivotally mounted on one end of said support member and having an aperture, and means for latching said panel-supporting bracket against pivotal movement and for inhibiting said support member against slidable movement when in its fully extended position comprising a swivel bar mounted on said support member for pivotal movement about a transverse axis intermediate its ends, said bar carrying a detent on one end thereof for engagement with the aperture in said panel-supporting bracket, a fixed stop formed integral with said track member, manually engageable means for locating the other end of said swivel bar in juxtaposition with said stop and for disengaging the detent of said swivel bar from the aperture in said panel-supporting bracket, and means including a face of said track member precluding operation of said manually engageable means when said support member is in any but its fully extended position.

JOSEPH F. STROPNICKY.

References Cited in the file of this patent

UNITED STATES PATENTS

| Number | Name | Date |
|---|---|---|
| 1,779,058 | Borgmann et al. | Oct. 21, 1930 |
| 2,415,604 | Nalley | Feb. 11, 1947 |
| 2,486,764 | Singer | Nov. 1, 1949 |
| 2,572,617 | Haury et al. | Oct. 23, 1951 |